(12) United States Patent
Sakai

(10) Patent No.: US 7,157,835 B2
(45) Date of Patent: Jan. 2, 2007

(54) OSCILLATING-TYPE GENERATOR

(75) Inventor: Yasuhiro Sakai, Shinagawa (JP)

(73) Assignee: USC Corporation, Tokyo (JP)

( * ) Notice: Subject to any disclaimer, the term of this patent is extended or adjusted under 35 U.S.C. 154(b) by 963 days.

(21) Appl. No.: 10/290,462

(22) Filed: Nov. 8, 2002

(65) Prior Publication Data

US 2006/0087200 A1    Apr. 27, 2006

(30) Foreign Application Priority Data

Nov. 12, 2001  (JP) .............................. 2001-346528
Jun. 25, 2002  (JP) .............................. 2002-185236

(51) Int. Cl.
    *H01L 41/08*    (2006.01)
(52) U.S. Cl. ..................... 310/339; 310/229
(58) Field of Classification Search ............. 310/321, 310/329, 339, 345
    See application file for complete search history.

(56) References Cited

U.S. PATENT DOCUMENTS 3,631,271 A * 12/1971 Shimada ................ 310/326
3,921,014 A * 11/1975 Jayne .................... 310/314
4,581,506 A *  4/1986 Bai et al. ............. 200/61.45 R
5,707,215 A *  1/1998 Olney et al. ............ 417/233
5,801,475 A *  9/1998 Kimura ................... 310/319
5,934,882 A *  8/1999 Olney et al. ............ 417/233
6,060,817 A *  5/2000 Mullen et al. ........... 310/339
6,407,484 B1 *  6/2002 Oliver et al. ............ 310/339
6,411,016 B1 *  6/2002 Umeda et al. ........... 310/339

* cited by examiner

*Primary Examiner*—Mark Budd
(74) *Attorney, Agent, or Firm*—Arent Fox PLLC

(57) ABSTRACT

An oscillating-type generator is provided in which an impact member impacts piezoelectric elements to generate electricity and which can efficiently increase the number of impacts and generate a large amount of electricity. This oscillating-type generator includes: a generator member 2 having an impact member 22 impacting piezoelectric elements 21 to generate electricity; and an elastic member 4 having elasticity, attached to the generator member 2 and, when applied an external force, adapted to oscillate the generator member 2 to cause the impact member 22 to repeat impacting the piezoelectric elements 21.

16 Claims, 15 Drawing Sheets

OSCILLATING-TYPE GENERATOR

BACKGROUND OF THE INVENTION

1. Field of the Invention

The present invention relates to a technical field of a generator using a piezoelectric element.

2. Description of the Prior Art

A technology has been proposed which utilizes a piezoelectric effect, by which a mechanical energy of a piezoelectric material is transformed into an electrical energy, and incorporates a piece of the piezoelectric material into a small device for use in generators. A variety of materials have been known, both inorganic and organic, which exhibit the piezoelectric effect. Of these, lead zirconium titanate (PZT)-based ceramic materials have attracted attention as a viable piezoelectric element and made a significant progress toward practical use.

For example, Japanese Patent Laid-Open No. 2001-145375 proposes a generator using piezoelectric elements. This official gazette discloses a structure in which two opposing piezoelectric elements are arranged in a container with an impact member (striking body) disposed between the two piezoelectric elements to reciprocally strike them.

In the construction described above, electricity can be generated by oscillating the container to cause the impact member to strike against the piezoelectric elements. To produce a large electric power as a whole, it is necessary to increase the amount of electricity generated in a single impact or to increase the number of times that the impact member strikes the piezoelectric elements. To increase the amount of electricity generated in a single strike, a steel ball is used as an impact member for increasing distortions of the piezoelectric elements when struck. However, when the container is vibrated to cause the impact member to impact the piezoelectric elements, the steel ball does not bounce but hits the piezoelectric element only once. Hence, in producing a greater amount of electricity as a whole, the problem that needs to be addressed is how efficiently the number of impacting actions can be increased.

Under this circumstance, it is an object of this invention to provide an oscillating-type generator which has an impact member striking against the piezoelectric elements and can efficiently increase the number of impact actions and thereby produce a large amount of electricity as a whole.

SUMMARY OF THE INVENTION

To solve the problems mentioned above, the present invention adopts the following means.

According to a first aspect, the present invention provides an oscillating-type generator which comprises: a generator member to generate electricity by causing an impact member to impact a piezoelectric element; and an elastic member having an elasticity and attached to the generator member, the elastic member being adapted to, when applied an external force, oscillate the generator member to cause the impact member to repeat impacting the piezoelectric element.

With this means, once an external force is applied in the form of pressure or vibration, the generator member enters an oscillation state by the elasticity of the elastic member, causing the impact member to repetitively impact the piezoelectric elements, generating electricity continuously.

According to a second aspect, the present invention provides an oscillating-type generator which comprises: a generator member to generate electricity by causing an impact member to impact piezoelectric elements arranged to oppose each other; and an elastic member having an elasticity and attached to the generator member, the elastic member being adapted to, when applied an external force, oscillate the generator member to cause the impact member to repeat impacting the opposing piezoelectric elements.

With this means, once an external force is applied in the form of pressure or vibration, the generator member enters an oscillation state by the elasticity of the elastic member, causing the impact member to reciprocate between the opposing piezoelectric elements, repetitively impacting them and generating electricity continuously.

A third aspect of the present invention provides an oscillating-type generator described in the first or second aspect, wherein as the elastic member an elastic body is selected which has a spring constant that matches the external force to reduce a period of the oscillation.

With this means, by reducing the period of oscillation of the generator member, the number of times that the impact member strikes the piezoelectric elements per unit time is increased. To reduce the period requires reducing the mass of the generator member and increasing the spring constant. Increasing the spring constant, however, consumes a large amount of energy in a short duration and thus requires the external force to be increased. When the external force contemplated is not large enough, an appropriate spring constant is selected that allows the generator member to be oscillated by that force and still makes the oscillation period as small as possible.

A fourth aspect of the present invention provides an oscillating-type generator described in any one of the first to third aspect, wherein the elastic member is made from an elastic body having a directivity in a spring constant and is connected to the generator member such that a direction of the smallest spring constant of the elastic member agrees with a direction in which the impact member impacts the piezoelectric elements.

With this means, the elastic member is most easily displaced in a direction in which the impact member strikes the piezoelectric elements. And because the elastic member is not easily displaced in other directions, motions that will interfere with the impact member as it impacts the piezoelectric elements can be blocked.

A fifth aspect of the present invention provides an oscillating-type generator described in any one of the first to fourth aspect, wherein a base member is connected to the generator member through the elastic member to support the generator member, the external force is applied to at least one of the generator member, the base member and the elastic member, and the elastic member is connected to the generator member and the base member so that a natural oscillation produced by the generator member and the elastic member resonates with a natural oscillation of the base member.

With this means, by applying the external force to one of the generator member, the base member and the elastic member, a combination of these, or all of them, the generator member is made to commence oscillation. The resonance prevents the oscillation energy of the generator member from being consumed by the base member, thus allowing the oscillation to continue efficiently.

A sixth aspect of the present invention provides an oscillating-type generator described in any one of the first to fourth aspect, wherein a base member is connected to the generator member through the elastic member to support the generator member, the external force is applied to at least one of the generator member and the elastic member, and the base member is fixed so that it does not oscillate.

With this means, the external force is applied to one of the generator member and the elastic member or both to cause the generator member to commence oscillation. Because the base member is securely fixed so as not to oscillate, the oscillation energy of the generator member can be prevented from being consumed by the base member, allowing the oscillation to continue efficiently.

A seventh aspect of the present invention provides an oscillating-type generator described in any one of the first to sixth aspect, wherein the elastic member is made from a leaf spring.

With this means, since the leaf spring has a directivity in spring constant, it can efficiently produce an oscillating state in the generator member by connecting the generator member and the base member.

An eighth aspect of the present invention provides an oscillating-type generator described in any one of the first to sixth aspect, wherein the elastic member is formed into a shape such that a spring constant for an oscillation in a direction in which the impact member impacts the piezoelectric elements is the smallest of spring constants of the elastic member.

With this means, the elastic member is made from a member which can provide the spring constant with a directivity by changing its length, width and height. The elastic member is formed, as by molding or machining, into a shape such that the spring constant of an oscillation in the impact direction of the impact member is the smallest of the spring constants of the elastic member.

A ninth aspect of the present invention provides an oscillating-type generator which comprises: a generator member to generate electricity by causing an impact member to impact piezoelectric elements; a base member to support the generator member; and an elastic member having an elasticity and connecting the generator member to the base member, the elastic member being adapted to, when applied an external force, oscillate the generator member to cause the impact member to repeat impacting the piezoelectric elements; wherein the generator member is restricted in motion to oscillate only in a direction in which the impact member impacts the piezoelectric elements.

With this means, once an external force is applied in the form of pressure or vibration, the generator member enters an oscillation state. Since the direction of oscillation is restricted in advance, the generator member oscillates only in a direction in which the impact member repetitively impacts the piezoelectric elements, generating electricity continuously.

A tenth aspect of the present invention provides an oscillating-type generator described in the ninth aspect, wherein the generator member is supported to oscillate only in a direction in which the impact member impacts the piezoelectric elements.

With this means, the generator member is supported so that its motion is restricted.

An eleventh aspect of the present invention provides an oscillating-type generator described in the ninth or tenth aspect, wherein a guide member is provided in proximity to the generator member to guide the generator member to oscillate only in a direction in which the impact member impacts the piezoelectric elements.

With this means, the oscillation motion of the generator member is restricted by the guide member provided near the generator member.

A twelfth aspect of the present invention provides an oscillating-type generator which comprises: a generator member to generate electricity by causing an impact member to impact piezoelectric elements; and elastic members with an elasticity; wherein the generator member is held between the elastic members and, when applied an external force, oscillates by expansion and contraction of the elastic members to cause the impact member to repeat impacting the piezoelectric elements.

With this means, once an external force is applied in the form of pressure or vibration, the generator member enters an oscillation state by the elastic expansion and contraction of the elastic member, causing the impact member to repetitively impact the piezoelectric elements, generating electricity continuously. Further, because the generator member is held between the elastic members, its oscillation direction is restricted.

A thirteenth aspect of the present invention provides an oscillating-type generator described in the twelfth aspect, wherein the elastic members are connected to opposite ends of the generator member so that the expansion/contraction direction of the elastic members agrees with an impact direction of the impact member of the generator member.

With this means, once an external force is applied in the form of pressure or vibration, the generator member enters an oscillation state by the elastic expansion and contraction of the elastic member, causing the impact member to repetitively impact the piezoelectric elements, generating electricity continuously. Further, because the generator member is held at its opposite ends between the elastic members, it is allowed to oscillate only in the longitudinal direction.

A fourteenth aspect of the present invention provides an oscillating-type generator which comprises: a generator member to generate electricity by causing an impact member to impact piezoelectric elements; and an elastic member having an elasticity and attached to the generator member, the elastic member being adapted to, when applied an external force, oscillate the generator member to cause the impact member to repeat impacting the piezoelectric elements; wherein the generator member is arranged to be able to generate electricity for a plurality of oscillation directions.

With this means, once an external force is applied in the form of pressure or vibration, the generator member enters an oscillation state by the elasticity of the elastic member, causing the impact member to repetitively impact the piezoelectric elements, generating electricity continuously. Because the generator member is able to generate electricity for a plurality of oscillation directions, not just for a single predetermined oscillation direction, the generation efficiency for the external force is improved.

A fifteenth aspect of the present invention provides an oscillating-type generator described in the fourteenth aspect, wherein the impact member and the piezoelectric elements are accommodated in a housing and a plurality of such housings are combined to cross each other and connected to the elastic member.

With this means, because the housings are arranged to cross each other, when subjected to vibrations in a plurality of directions, the impact member in at least one of the housings impacts the piezoelectric elements to generate electricity. Further, since the impact member and the piezoelectric elements are combined as a set and accommodated in each of the housings that are assembled in a crossing configuration, the impact members do not interfere with each other during oscillation, thus efficiently generating electricity.

A sixteenth aspect of the present invention provides an oscillating-type generator described in the ninth to fifteenth aspect, wherein the elastic member is made from a coil spring.

With this means, even if a coil spring, an elastic member with no directivity in spring constant, is used for the elastic member, the impact member can be made to impact the piezoelectric elements efficiently to generate electricity continuously by restricting the direction of oscillation of the generator member or by enabling electric generation in a plurality of oscillation directions.

DETAILED DESCRIPTION OF THE PREFERRED EMBODIMENT

Figure 1:
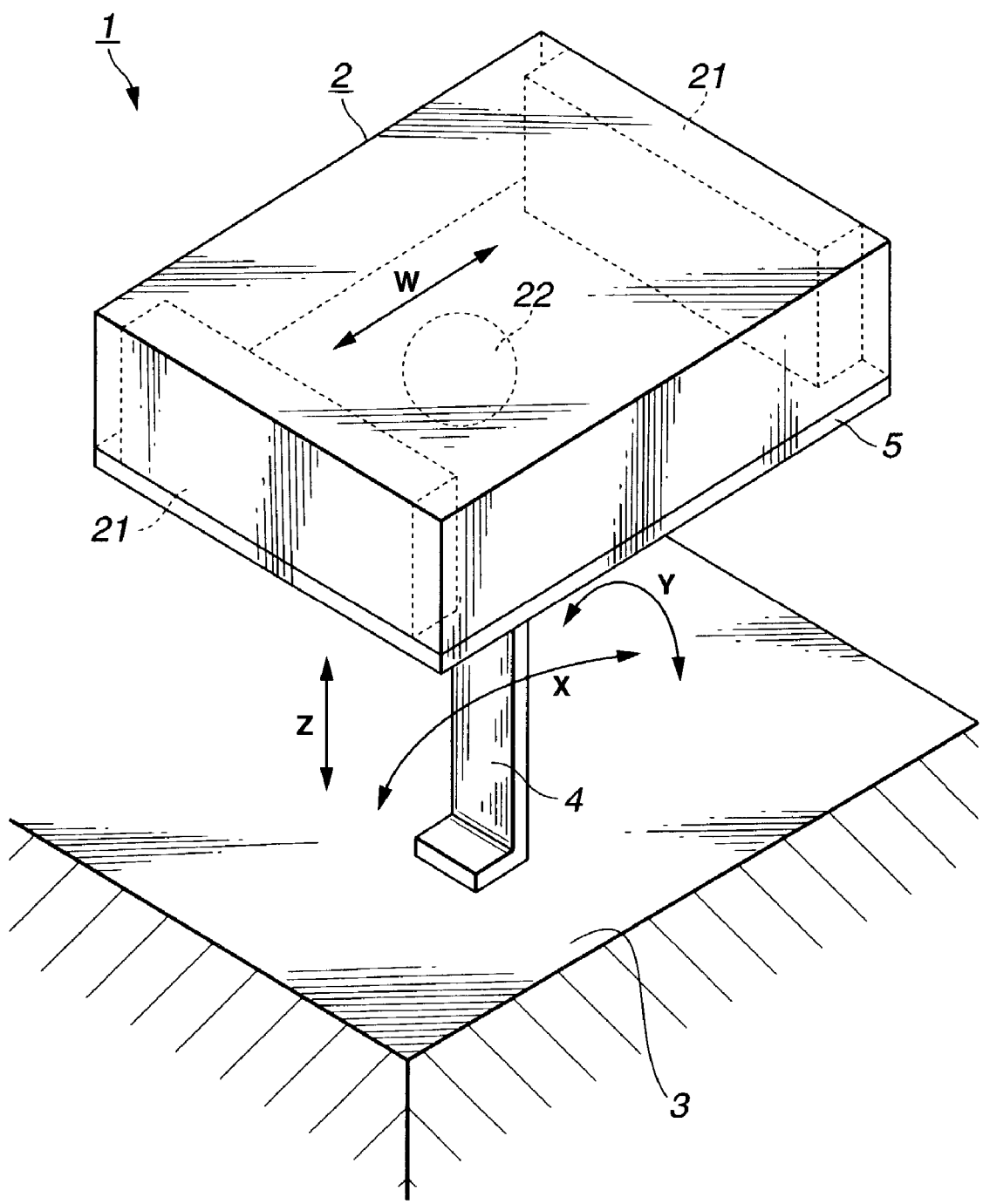
FIG. 1 is an external perspective view of an embodiment 1.

The embodiment 1 of the present invention will be described by referring to the accompanying drawings. FIG. 1 is an external perspective view of the embodiment 1, FIG. 2 an explanatory view showing the operation of the embodiment 1, FIG. 3 a detailed cross-sectional view of a generator member in the embodiment 1, and FIG. 4 a graph showing an oscillating state of the embodiment 1.

An oscillating-type generator 1 of this invention includes a generator member 2 and an elastic member 4. The generator member 2 generates electricity by striking an impact member 22 against a piezoelectric element 21. The elastic member 4 is attached to the generator member 2 and, when applied an external force, vibrates the generator member 2 to cause the impact member 22 to repetitively impact the piezoelectric element 21.

While in this embodiment the piezoelectric element 21 of the generator member 2 is installed at two opposing locations with the impact member 22 disposed reciprocally movable between the piezoelectric elements 21, 21, the piezoelectric element 21 may be provided at one location or at three or more locations. The generator member 2 is supported on a base member 3 through the elastic member 4.

The elastic member 4 is secured at its ends to the generator member 2 and the base member 3 with appropriate means (e.g., bonding and fusing). The elastic member 4 is made from an elastic material having a directivity in its spring constant and is connected to the generator member 2 such that a direction of the smallest of spring constants of the elastic member 4 agrees with a direction in which the impact member 22 strikes the piezoelectric element 21 (hereinafter referred to as an impact direction). That is, if, of the spring constants in X, Y and Z directions of the elastic member 4, the smallest spring constant has an X direction, the elastic member 4 is attached to the generator member 2 so that the direction of the arrow X matches the direction of impact (direction of arrow W in FIG. 1). Although, in FIG. 1 the underside of the generator member 2 is connected with the elastic member 4, the positional relation between the generator member 2 and the base member 3 is not limited to this configuration. The elastic member 4 may be attached to the lateral side or the upper side of the generator member 2 for connection with the base member 3 arranged at an appropriate position. As described above, the elastic member 4 of this embodiment 1 has a small spring constant in the X direction and utilizes the bending in this direction, so that the elastic member 4 in the embodiment 1 may also be termed as a bending elastic member.

The spring constant of the elastic member 4 in the impact direction is selected to match an applied external force to make the period of oscillation of the generator member 2 as small as possible. By reducing the oscillation cycle of the generator member 2, the number of impacts made by the impact member 22 against the piezoelectric element 21 per unit time can be increased, which in turn increases the amount of electricity produced as a whole. To reduce the cycle requires reducing a mass of the generator member and increasing the spring constant. Increasing the spring constant, however, consumes a large amount of energy in a short duration and thus requires the external force to be increased. The magnitude of the external force differs according to the environment in which the oscillating-type generator 1 is installed. Thus, considering an expected magnitude of the external force, an appropriate spring constant is selected that allows the generator member to be oscillated or pressurized by that force and still makes the oscillation period as small as possible. The embodiment 1 represents a case where an external force is applied to at least one of the generator member 2, base member 3 and elastic member 4. In this case, the elastic member 4 is secured to the generator member 2 and the base member 3 so that a natural vibration produced by the generator member 2 and the elastic member 4 and a natural vibration of the base member 3 resonate. By matching this arrangement to various conditions including a total mass of the generator member 2, an attenuation of vibrations due to a parasitic vibration can be reduced. Where an external force is applied to at least one of the generator member 2 and the elastic member 4, the vibration attenuation due to the parasitic vibration can be reduced by securely holding the base member 3 unoscillatable. (The same is true of other embodiments.)

In the embodiment 1, a leaf spring is used as an elastic material for the elastic member 4. The leaf spring is an elastic body that has a directivity in the spring constant and has a particularly small spring constant in one direction. Hence, the leaf spring is secured to the generator member 2 so that the direction in which the leaf spring is deflected most easily (X direction) is aligned with the impact direction (W direction). The spring constants in Y and Z directions of the leaf spring, when compared to that of the X direction, are close to infinity. Therefore, if the elastic member 4 is applied an external force, it is not deformed or displaced in directions perpendicular to the impact direction (i.e., directions in which the impact member 22 strikes the side surfaces of a housing 23 on which no piezoelectric elements are installed and directions in which the generator member 2 is displaced vertically), with the result that vibrations that may hinder the motion of the impact member 22 in the impact direction are not easily generated. Further, since the elastic member 4 is flexible and easily deformed in only the X direction, an external force applied from other directions can easily be transformed into a motion in the X direction. As described above, the leaf spring is suitable for generating vibrations in the impact direction.

Figure 3:
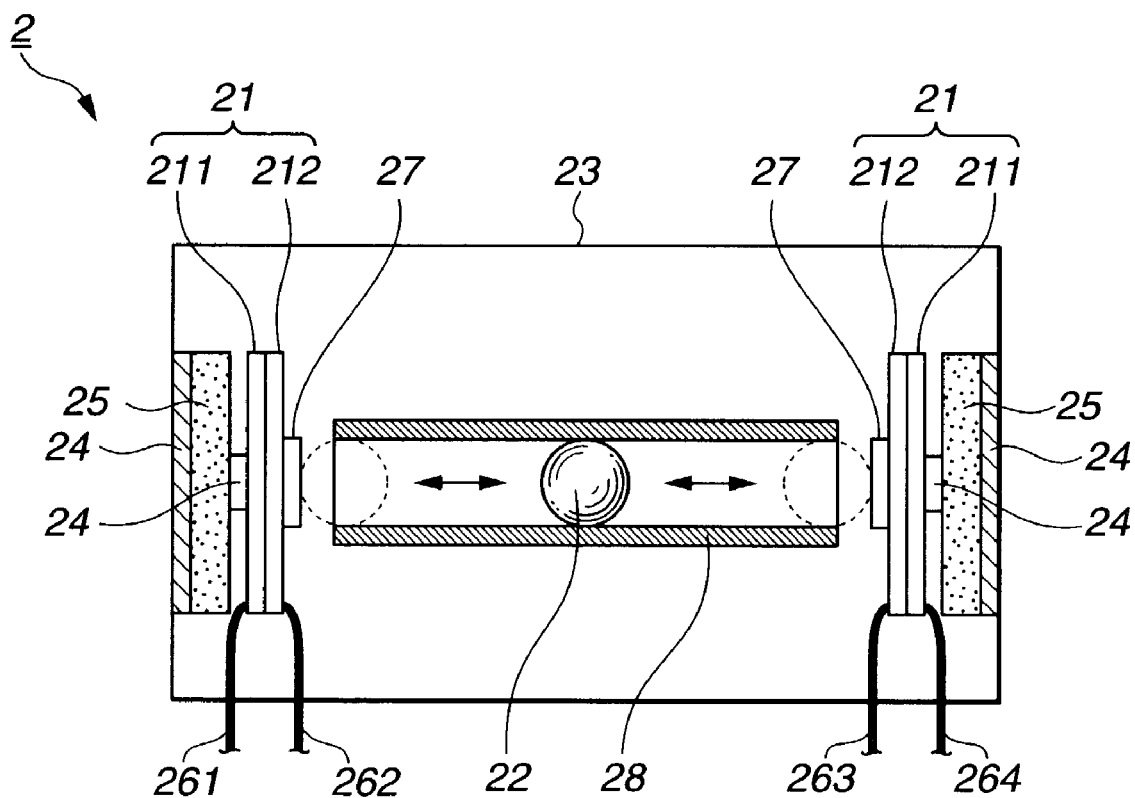
FIG. 3 is a cross section showing details of a generator member of the embodiment 1.

The construction of the generator member 2 will be described by referring to FIG. 3. The impact member 22 rolling in a boxlike housing 23 is arranged to hit against the piezoelectric elements 21 secured to the opposing inner walls of the housing 23. The impact member 22 is formed as a ball. The piezoelectric elements 21 each have two piezoceramic plates 211, 212 of PZT bonded together with their polarities set in opposite directions so that a canceling effect due to polarization in the series-connected generation circuit can be prevented to enhance the generation performance. The piezoelectric element 21 is partially bonded to only the central part of a platelike cushion material 25 with an adhesive 24 (other fixing methods than bonding may be used). The cushion material 25 is secured to the housing with the adhesive 24. This arrangement protects the piezoelectric elements 21 from the impacts of the impact member 22 and allows the piezoceramic plates 211, 212 to continue oscillation, enhancing the generation performance. Filmlike electrodes (not shown) formed on the front and back surfaces of the piezoelectric element 21 are each connected with a lead wire 261–264 that is drawn out to a circuit unit 5 described later. A protector 27 is secured to the surface of the piezoelectric element 21 (the surface against which the impact member 22 strikes) to protect the piezoelectric element 21. Installed between the opposing piezoelectric elements 21 is a guide 28 which restricts the direction of rolling motion of the impact member 22 and thereby guides it to impact precisely that part of the piezoelectric element 21 where the protector 27 is secured. As the guide 28 a cylindrical guide is shown here. It may be partition plates.

As for materials of individual members, the piezoceramic plates 211, 212 most suitably use lead zirconium titanate materials but may use other materials. It is preferred that the piezoceramic plates 211, 212 be as hard and have as high a Q-factor as possible to maintain a longer oscillation and thereby generate a greater amount of electricity. More specifically, the Q-factor is preferably 1,000 or higher and, more preferably, 2,000 or higher. The cushion material 25 may suitably use synthetic resin, rubber or a soft spongy material made of these. One such example is foamed polyethylene. The impact member 22 suitably use materials that are heavy for an improved generation efficiency to such an extent as will not destroy the piezoelectric element 21. Examples of such materials include tungsten and iron. As for materials for the protector 27, hard metals and synthetic resins are suited, such as phosphor bronze and stainless steel. Phosphor bronze with good machinability is particularly preferred.

The construction of the generator member 2 and the method of causing the piezoelectric element 21 to generate electricity are not limited to the above. For example, two impact members may be used, which is disclosed in Japanese Patent Laid-Open No. 2001-145375, and the impact member may be suspended by a spring material. Further, a metal plate, whose thickness is coordinated to produce a distortion corresponding in magnitude to that of a single layer piezoceramic plate 211, may be bonded to the piezoceramic plate and then struck with the impact member 22.

The base member 3 is a member for mounting the generator member 2 and may be formed as an independent member or double as a container or case of the oscillating-type generator 1. As described above, in this embodiment an external force is applied also to the base member 3.

Figure 2:
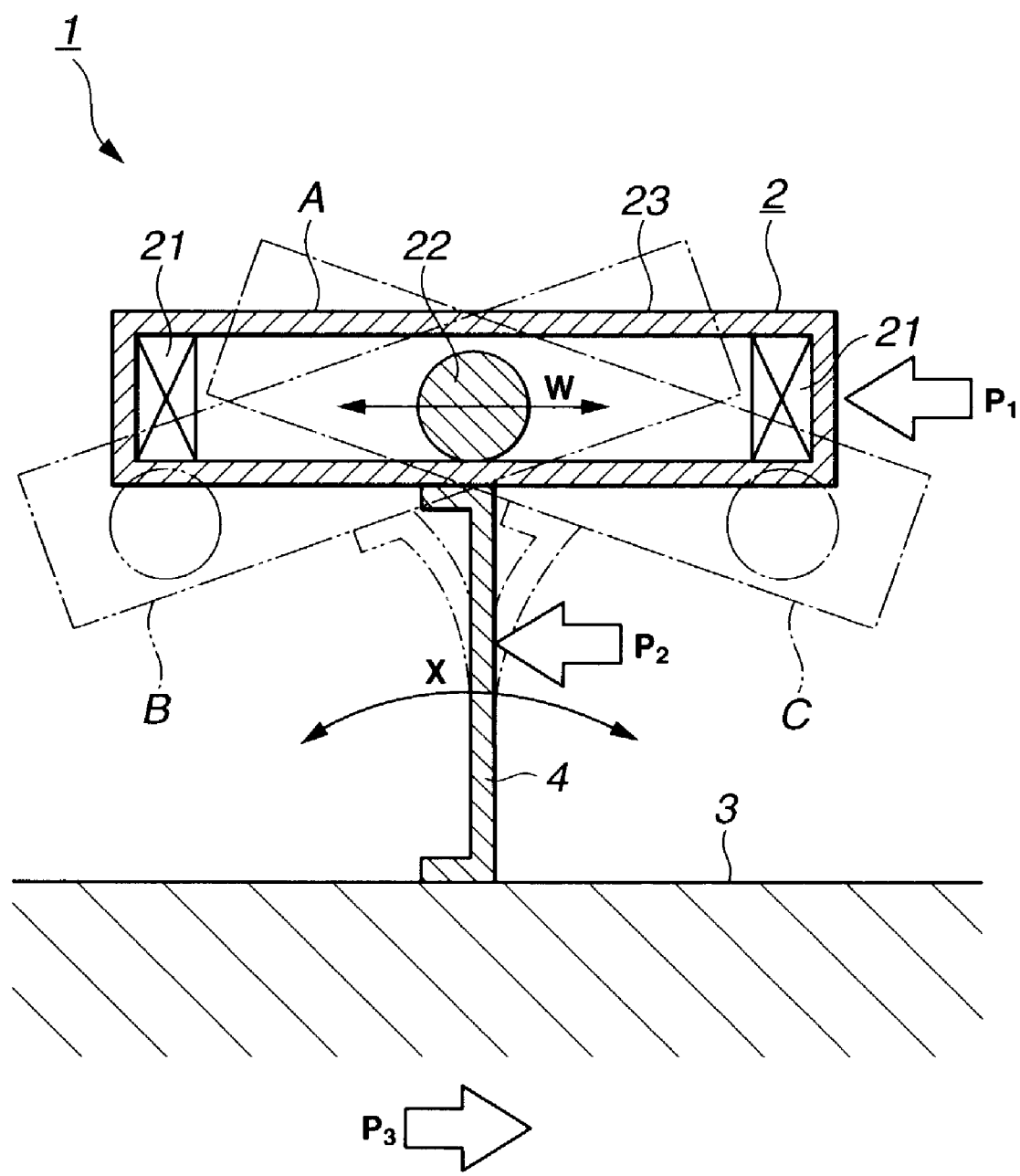
FIG. 2 is a schematic diagram showing an operation of the embodiment 1.

Electricity generated by the generator member 2 is led out through the lead wires 261–264 to the circuit unit 5. The circuit unit 5 includes a rectifying circuit for rectifying the AC power generated by the generator member 2 and a charging circuit, and supplies electricity to external circuits. In FIG. 2 the circuit unit 5 is not shown (in other embodiments, too, the circuit unit 5 is omitted from the similar drawings).

Figure 4:
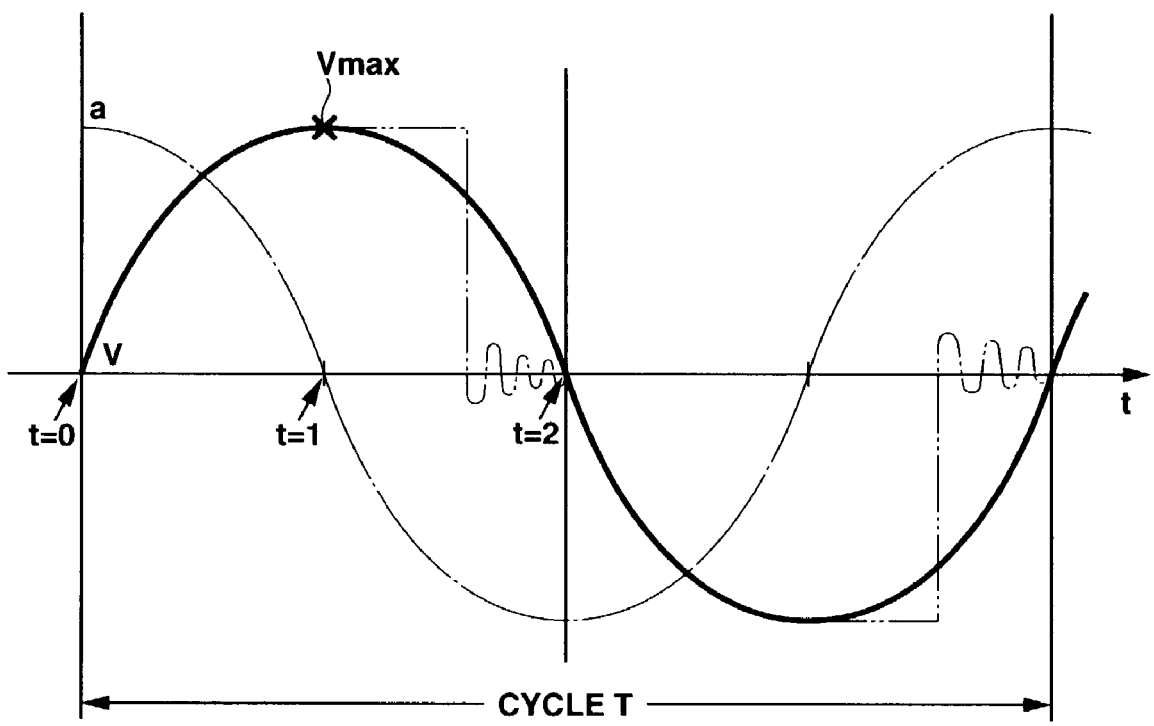
FIG. 4 is a graph showing an oscillating state of the embodiment 1.

The operation of the oscillating-type generator 1 of the above construction will be described by referring to FIG. 2 and FIG. 4. FIG. 4 is a graph illustrating the motion of the impact member 22 and of the housing 23 of the generator member 2. First, when the oscillating-type generator 1 is not applied any force, the elastic member 4 assumes a neutral state connecting the generator member 2 and the base member 3. In FIG. 2, the oscillating motion is illustrated in three representative states. For the sake of explanation, the neutral state (shown in solid line in FIG. 2) is referred to as state (A), a state in which the elastic member is deflected to the left (shown in two-dot chain line in FIG. 2) is referred to as state (B), and a state in which the elastic member is deflected to the right (shown in one-dot chain line in FIG. 2) is referred to as state (C).

When at least one of external forces P1, P2, P3 is applied to the generator member 2, the base member 3 and the elastic member 4, respectively, as shown in FIG. 2, the generator member 2 is deflected toward the left to assume the state (B). The external forces P1–P3 may be applied independently, or in combination, or all at the same time. In the following explanation, these external forces are generally referred to as P. The external forces P1–P3 may of course be applied in directions opposite those shown in FIG. 2 to deflect the generator to the opposite side.

When the external force P is released, the generator member 2 repeats an oscillation defined by the following equation that describes a relation between displacement x of the generator member 2 and time t:

$$m \cdot \frac{d^2 x}{dt^2} + c \cdot \frac{dx}{dt} + kx = 0 \qquad (1)$$

where m is a total mass of the generator member 2, c is an attenuation coefficient (viscous resistance, air resistance, kinetic energy consumption by the impact member, etc.), and k is a spring constant. In FIG. 4, a (one-dot chain line) represents an acceleration of the housing 23 of the generator member 2 and v (solid line) represents a velocity of the housing 23. If the instant when the external force P is released is taken as t=0, the generator member 2 oscillates in period or cycle T, as shown in FIG. 4. That is, the generator member 2 starts to oscillate with a period T from the state (B) in the direction of arrow X of FIG. 2. The impact member 22 moves at almost the same speed as the housing 23 (moves with the housing 23) up to Vmax at t=1, at which time the state of the generator member 2 is represented by the state (A) of FIG. 2. When the velocity reaches Vmax, the acceleration becomes zero and thus the impact member 22 moves at a speed almost equal to Vmax (indicated by 2-dot chain line in the graph of FIG. 4). Thus, the impact member 22 will impact the already decelerating housing 23 somewhere between t=1 and t=2, i.e., between the state (A) and the state (C). In other words, the impact member 22 strikes the piezoelectric element 21 in this period of time, generating electricity. Then, until the oscillation shown by the states (A) to (C) is attenuated, the impact member 22 continues to impact the piezoelectric element 21, repetitively generating electricity. This relationship does not change when the period T becomes smaller (motion becomes faster). This means that reducing the period T can increase the number of impacts that occur per unit time. As described above, by applying the external force P only once and releasing it, the generator member 2 can be made to oscillate and undergo the repetitive impact process, increasing the amount of electricity generated.

In this invention, the elastic member 4 is used to amplify the external force P. This amplification is intended not just to increase the deflection of the generator member 2 but also to reduce the period T of oscillation thereby increasing the number of impacts per unit time. Therefore, there is no need to increase an oscillation stroke by elongating the elastic member 4. The only requirement is to select an elastic member 4 with an appropriate spring constant that matches the external force P to render the period T as small as possible. Further, since the generator member 2 and the elastic member 4 resonate with the base member 3, the vibration energy of the generator member 2 is not consumed by the base member 3, allowing oscillations to be efficiently generated and maintained. Therefore, unlike the construction in which the deflection of the generator member 2 is simply increased, the length of the elastic member 4 is not necessarily related to the period T, so that the elastic member 4, if used, can be formed small as a whole.

Figure 5:
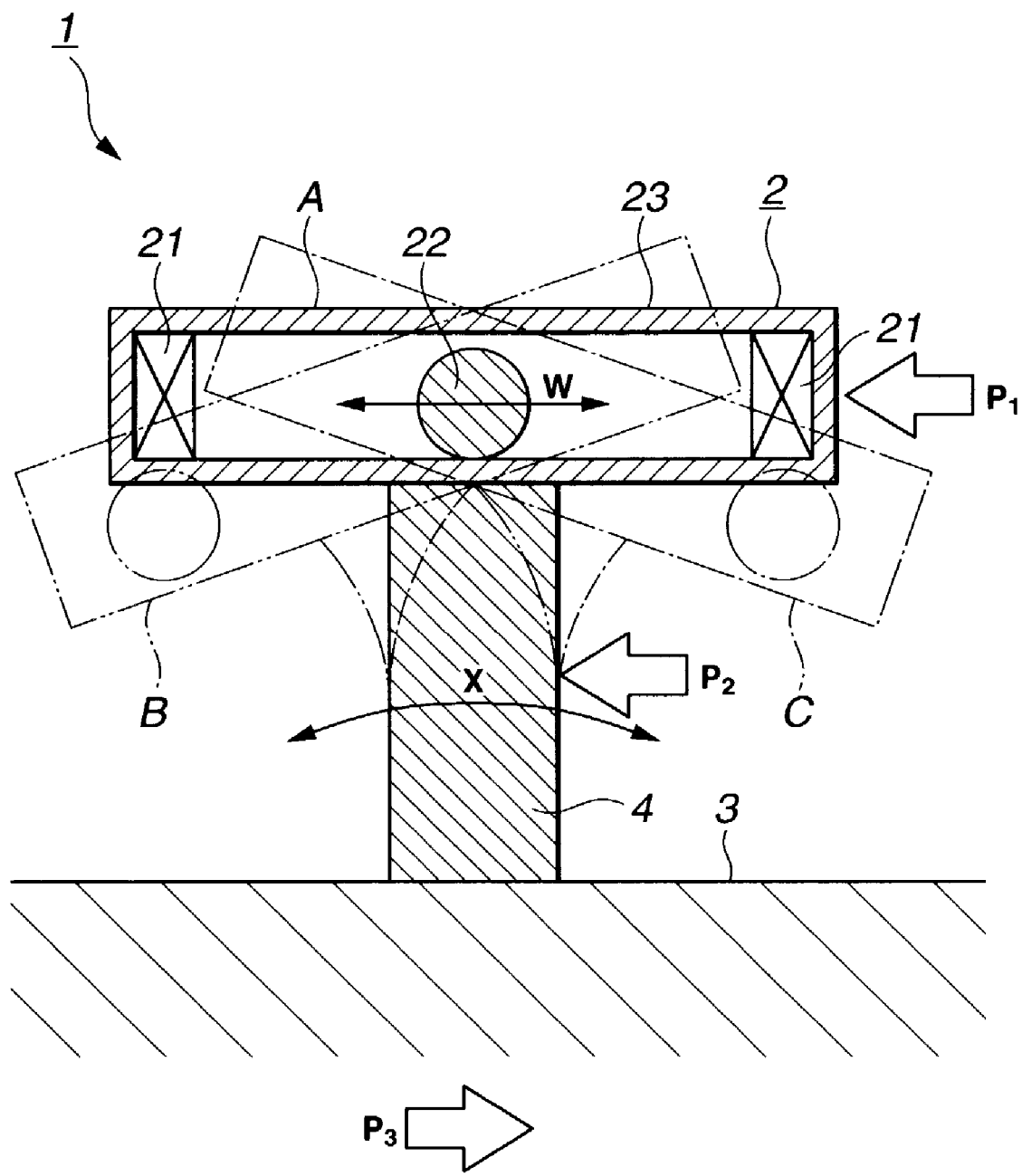
FIG. 5 is a schematic diagram showing an operation of an embodiment 2.
Figure 6:
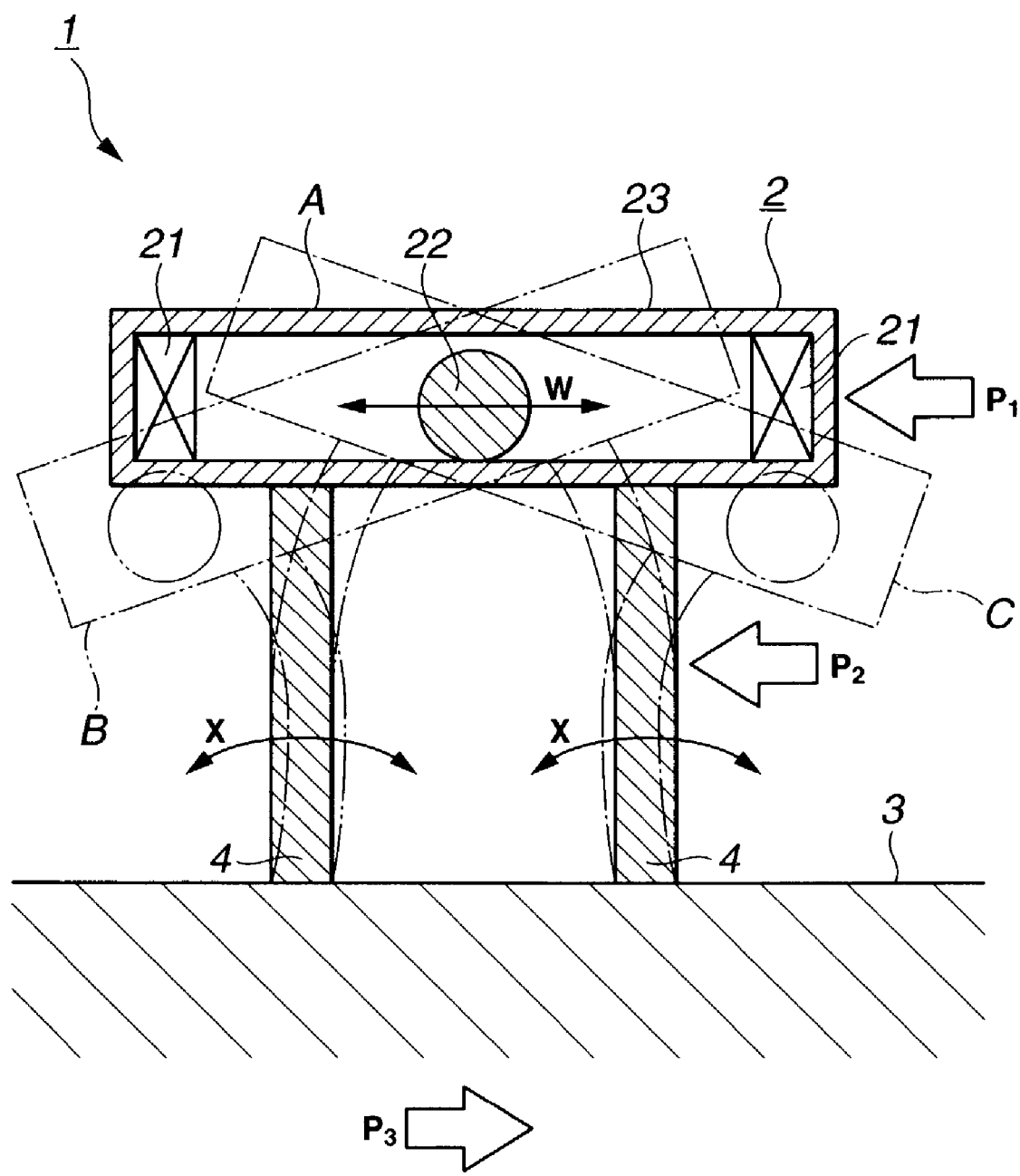
FIG. 6 is a schematic diagram showing an operation of a variation of the embodiment 2.

Next, an embodiment 2 of this invention will be described. FIG. 5 shows how the embodiment 2 operates and FIG. 6 illustrates the operation of a variation of the embodiment 2. In the embodiment 2, like reference numerals are given to the identical parts with those of the embodiment 1 and their explanations are omitted.

In this embodiment, the elastic member 4 uses a rubber material instead of the leaf spring of the embodiment 1 and, in other respects, its construction is similar to that of the embodiment 1. The rubber material is shaped to have an appropriate length, width and height to produce a desired directivity in the spring constant. As in the case of the leaf spring, the elastic member 4 is attached to the generator member 2 so that the direction in which the spring constant of the rubber material is the smallest (X direction) matches the impact direction (W direction in FIG. 5). That is, the rubber material has its thickness in the X direction formed smaller than those of other directions to reduce the spring constant of that direction. Since the elastic member 4 of the embodiment 2 is formed so as to be easily bent in the X direction, it can also be referred to as a bending elastic member as in the embodiment 1. The spring constant of the elastic member 4 is selected to coordinate with the external force P to reduce the oscillation period T, and the elastic member 4 is connected so that the generator member 2 and elastic member 4 resonate with the base member 3. More specifically, silicone rubber is suited for the rubber material.

Rather than the rubber material, it is possible to use gel materials (heat reversible elastomer, etc.), foamed materials, low-Young's modulus Ti alloys (Ti alloys with large elastic deformations).

With this arrangement the elastic member 4 of the embodiment 2 can cause the generator member 2 to oscillate efficiently, increasing the number of impacts of the impact member per unit time and the amount of electricity generated. As for the rubber and gel materials, by changing the length, width and height, the spring constant can easily be provided with a desired directivity or the value of the spring constant changed.

Further, as shown in FIG. 6, the elastic member 4 may be divided into a plurality of pieces (two in this example) in connecting the generator member 2 and the base member 3. In this case also, these elastic members 4 are all mounted so that the X direction in which the spring constant is smallest agrees with the impact direction (W direction). The construction of FIG. 6 may be applied to the embodiment 1.

Figure 7:
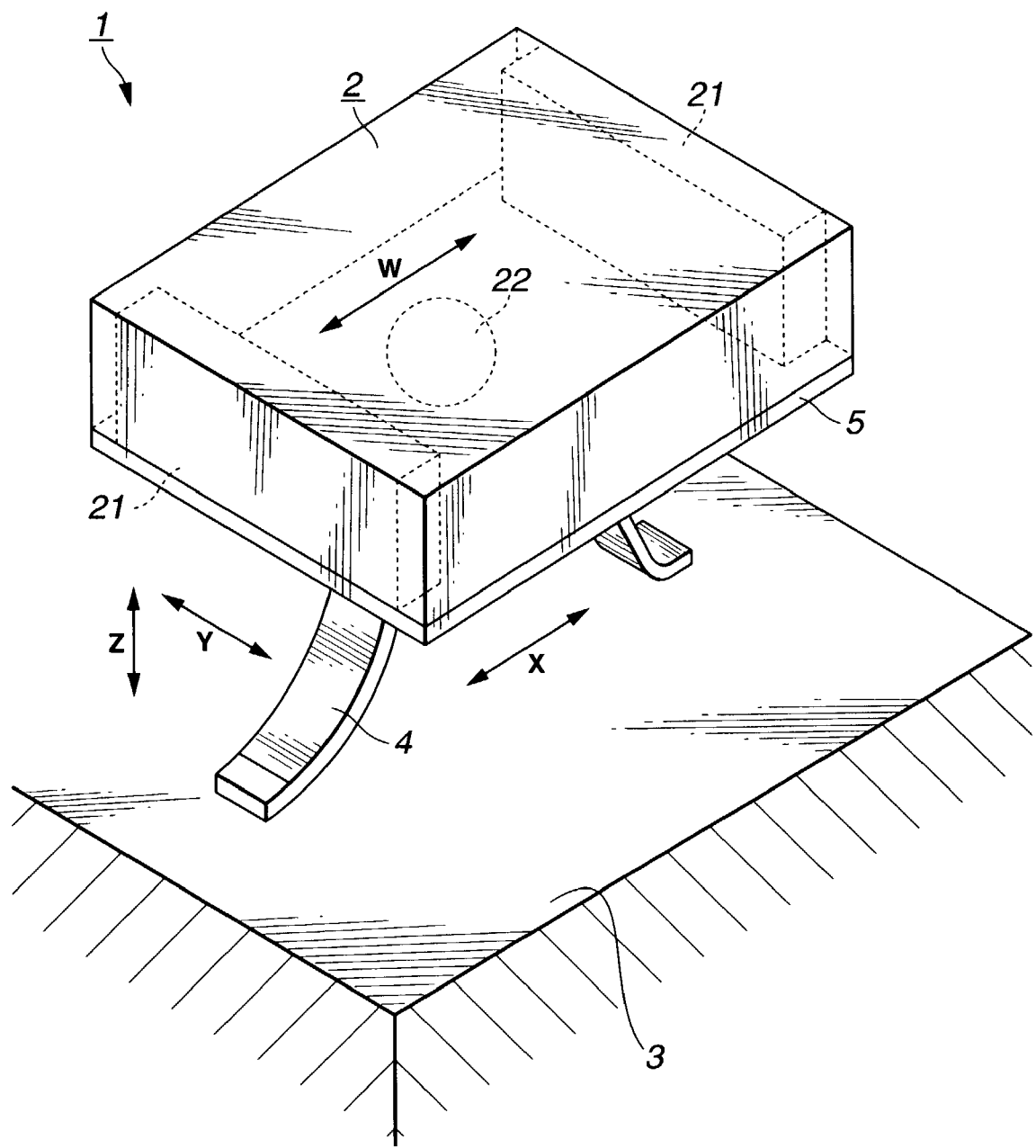
FIG. 7 is an external perspective view of an embodiment 3.
Figure 8:
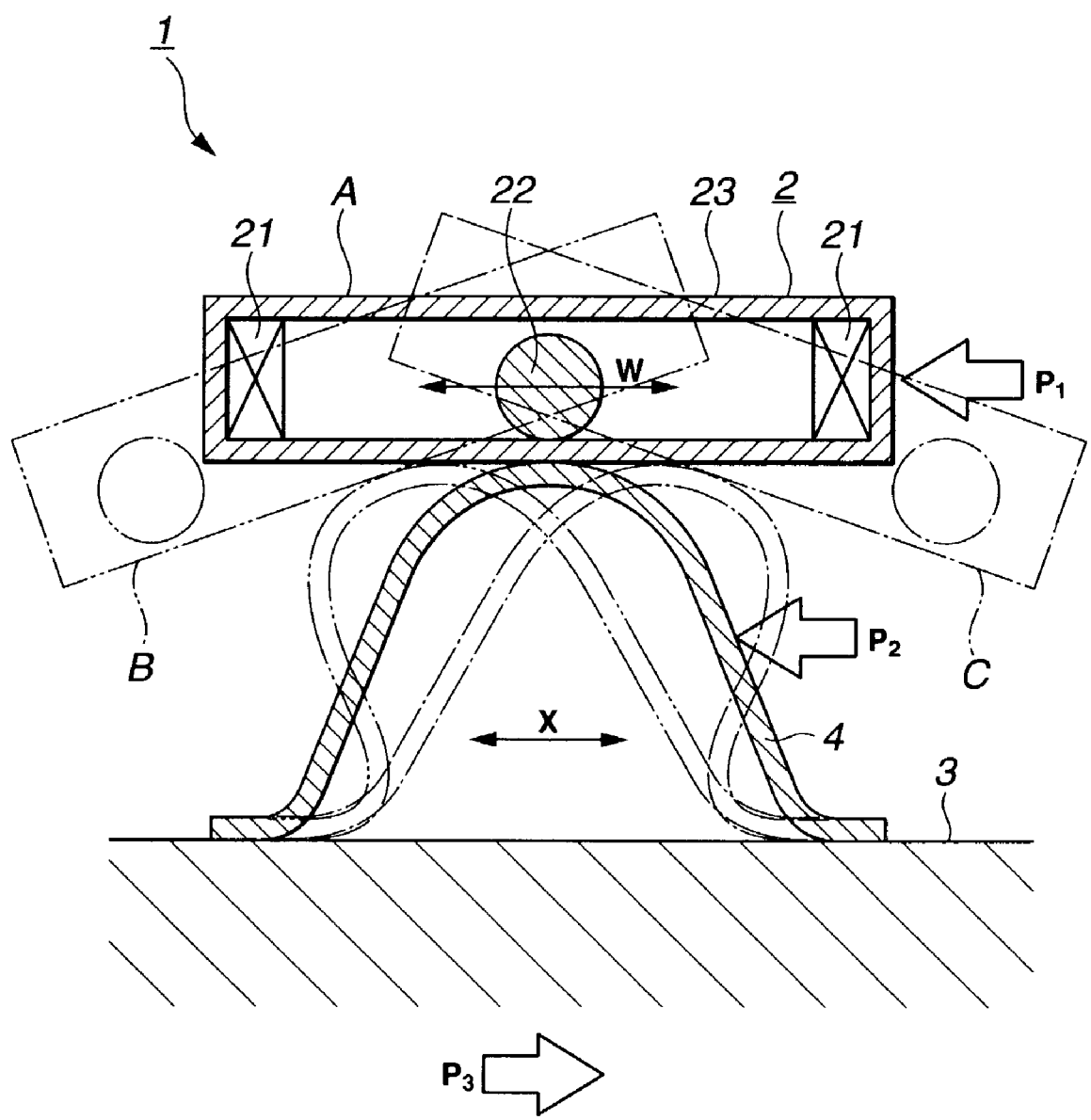
FIG. 8 is a schematic diagram showing an operation of the embodiment 3.

Next, an embodiment 3 of this invention will be described by referring to the accompanying drawings. FIG. 7 is an external perspective view of the embodiment 3, and FIG. 8 shows how the embodiment 3 operates. Parts identical with those of the embodiment 1 are given like reference numbers and their explanations are omitted.

The embodiment 3 is a variation of the previous embodiment 1 and 2 in terms of how the elastic member 4 is mounted. As the elastic member 4 a leaf spring is used in this embodiment. As shown in FIG. 7 and FIG. 8, the elastic member 4 made from an elongate, thin, platelike elastic body is curved and fixed to the base member 3, with the generator member 2 secured to a curved apex portion of the elastic member 4 through a narrow surface contact. The generator member 2 is mounted in such a way that the impact direction of the generator member 2 (W direction) aligns with a line connecting the ends of the elastic member 4. With the elastic member 4 curved in this manner and moved in the most easily displaceable direction (X direction), the impact member 22 can be struck against the piezoelectric elements 21. The elastic member 4 may be formed from rubber or gel materials shaped like a thin plate, instead of the leaf spring. In this embodiment too, the elastic member 4 utilizes the bending in the direction of arrow X in which its spring constant is smallest, so that it can also be referred to as a bending elastic member.

When the oscillating-type generator 1 constructed as described above receives at least one of P1 to P3 as the external force P, the generator member 2 is oscillated in a combination of lateral and rotational motions, as shown in FIG. 8. As in the case of the embodiment 1, the application of the external force P only once can cause a lasting oscillation and increase the amount of electricity generated. Other actions and effects of this embodiment are similar to those of the embodiment 1.

Figure 9:
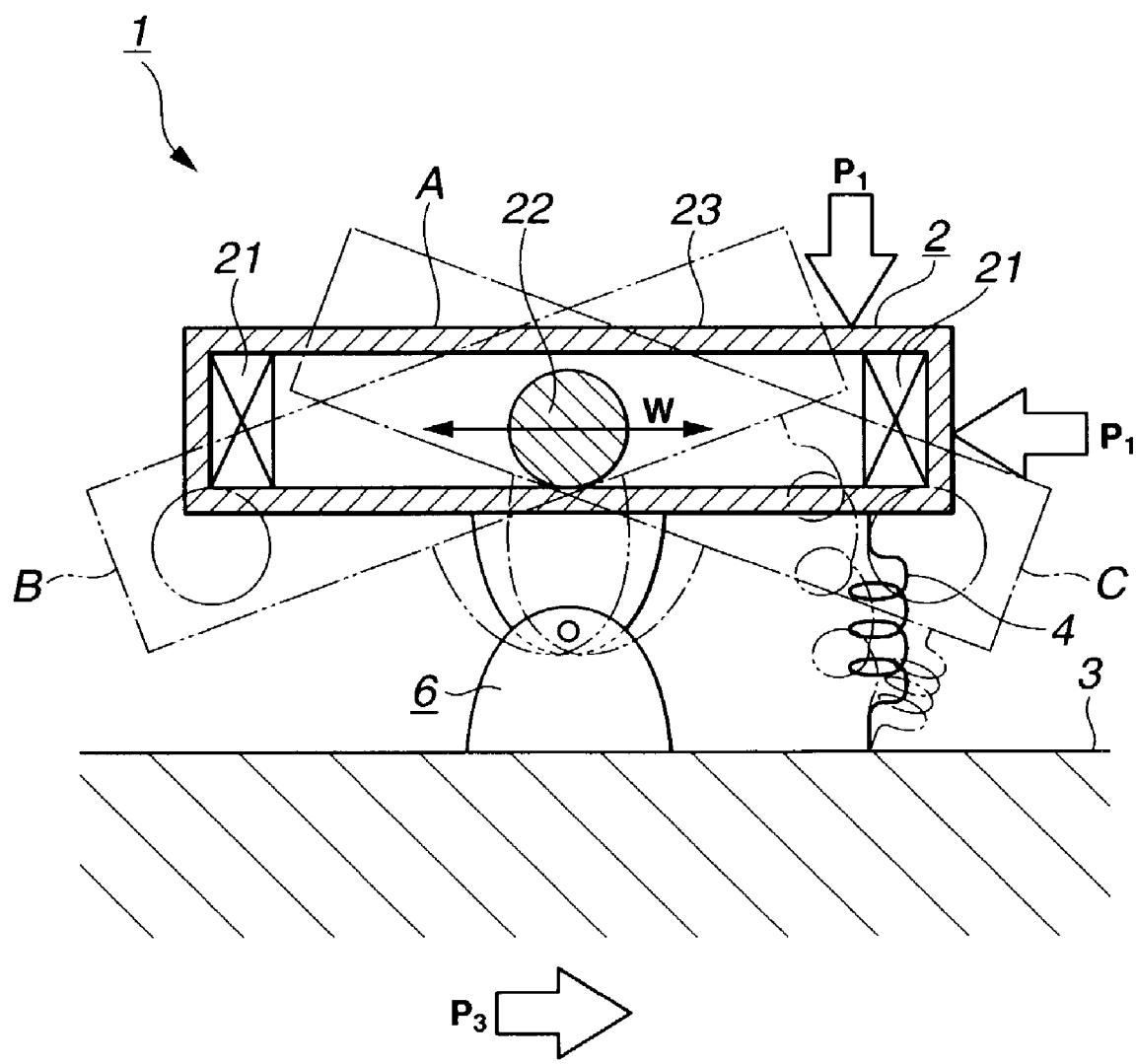
FIG. 9 is a schematic diagram showing an operation of an embodiment 4.
Figure 10:
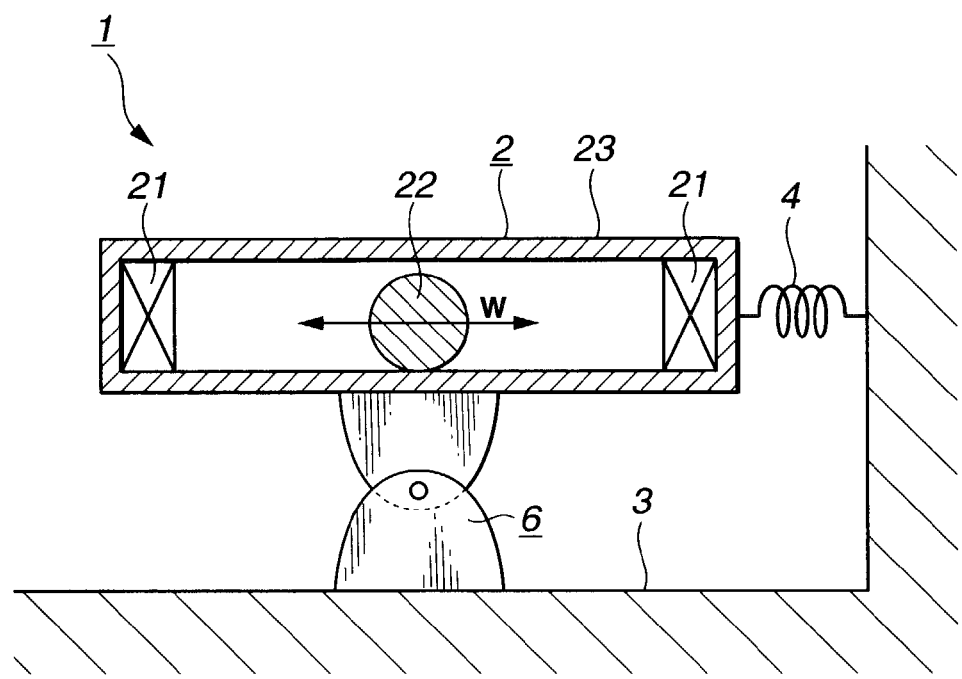
FIG. 10 is a schematic diagram showing an operation of a variation of the embodiment 4.
Figure 11:
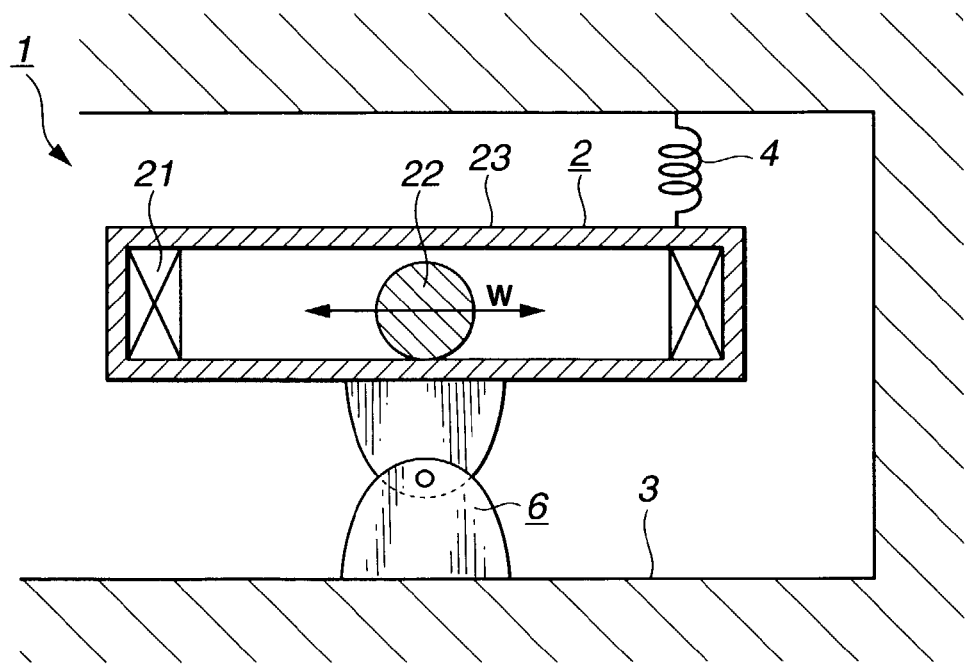
FIG. 11 is a schematic diagram showing an operation of another variation of the embodiment 4.

Next, an embodiment 4 of this invention will be described with reference to the accompanying drawings. FIG. 9 shows the operation of the embodiment 4 and FIG. 10 and FIG. 11 illustrate variations of the embodiment 4. Parts identical with those of the embodiment 1 are given like reference numbers and their explanations are omitted.

The oscillating-type generator 1 of the embodiment 4 is characterized in that the elastic member 4 connects the generator member 2 to the base member 3 and that the generator member 2 is restricted in operation to oscillate only in a direction that causes the impact member 22 to strike the piezoelectric element 21.

In this embodiment a coil spring is used as the elastic member 4 and is secured at one end to the generator member 2 and at the other end to the base member 3. Between the base member 3 and the generator member 2 is provided a support member 6 that pivotally supports the generator member 2 in such a manner that the generator member 2 can only oscillate in a direction that causes the impact member 22 to impact the piezoelectric element 21. That is, the generator member 2 is allowed by the support member 6 to pivot only in the impact direction (W direction). In this embodiment, since the oscillating direction of the generator member 2 is restricted by the support member 6, it is possible to use for the elastic member 4 a coil spring that does not has a directivity in the spring constant. As described above, because the oscillation direction of the elastic member 4 of the embodiment 4 is restricted so that it can oscillate in only the expansion/contraction direction, the elastic member 4 can be called an expansion elastic member.

The external force P1 applied to the generator member 2 may be applied from any direction, such as lateral and vertical direction of the generator member 2, as shown in FIG. 9. Although not shown, the external force may also be applied to the elastic member 4 or the support member 6. Utilizing a natural vibration of the generator member 2 produced by the application of the external force P as described above, the number of impacts made by the impact member 22 against the piezoelectric element 21 can be increased to generate a large amount of electricity, as in the embodiment 1. Other actions and effects of this embodiment is similar to those of the embodiment 1.

A variation of the embodiment 4 is shown in FIG. 10 and FIG. 11 in which the elastic member 4 is attached at different positions. As long as the elastic member 4 can cause the generator member 2 to oscillate in the impact direction, it may be mounted at any position on the generator member 2. FIG. 10 shows an example in which the elastic member 4 is attached to the lateral side of the generator member 2, and FIG. 11 represents a case where the elastic member 4 is attached to the top surface (on the side opposite the support member 6) of the generator member 2. At either position, the elastic member 4 upon receiving the external force P can cause the generator member 2 to oscillate in a manner similar to FIG. 9. Although in FIG. 10 and FIG. 11 the base member 3 mounted with the support member 6 and the base member 3 mounted with the elastic member 4 are connected together as an integral member, they may be formed as separate members as required.

Figure 12:
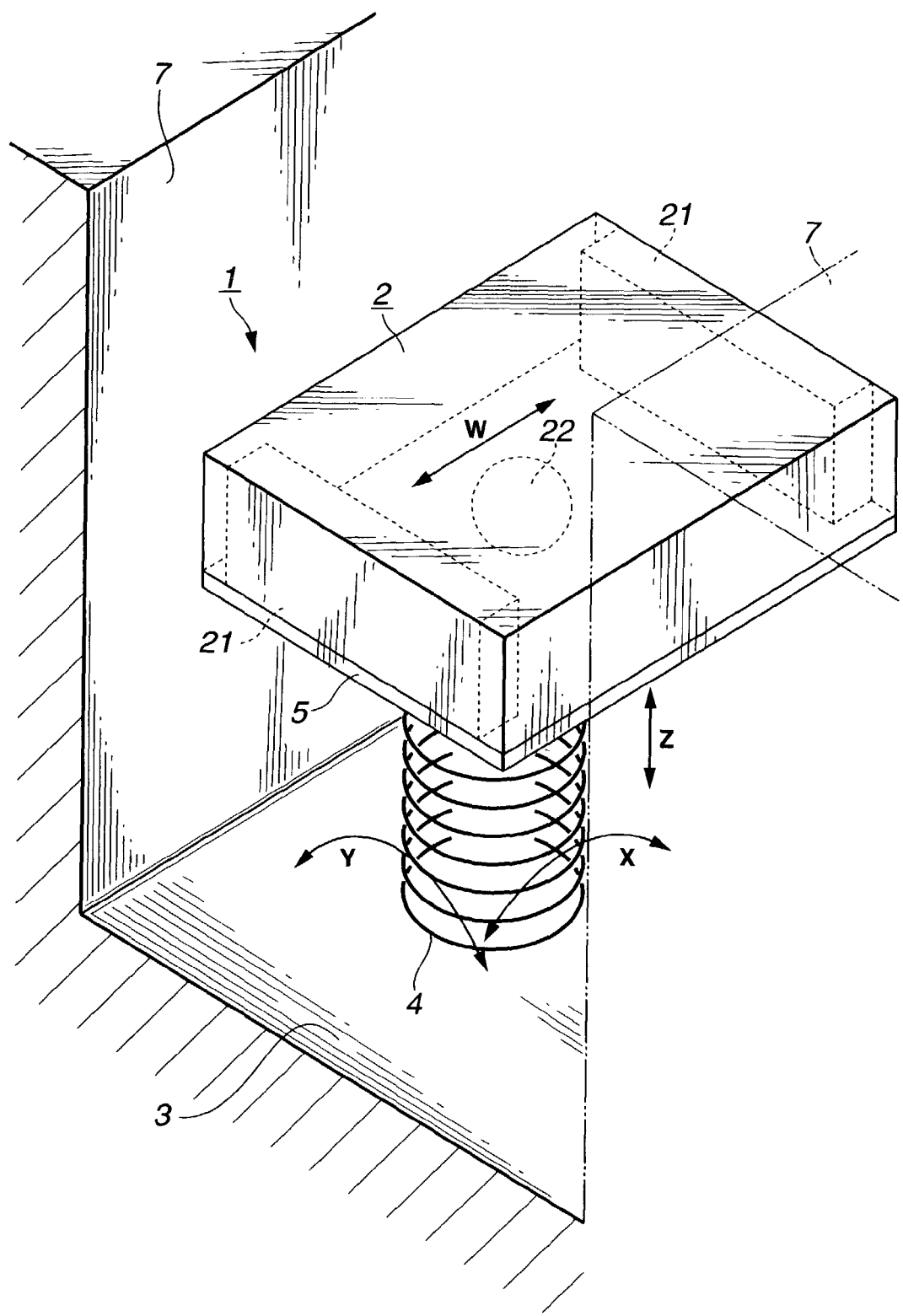
FIG. 12 is an external perspective view of an embodiment 5.
Figure 13:
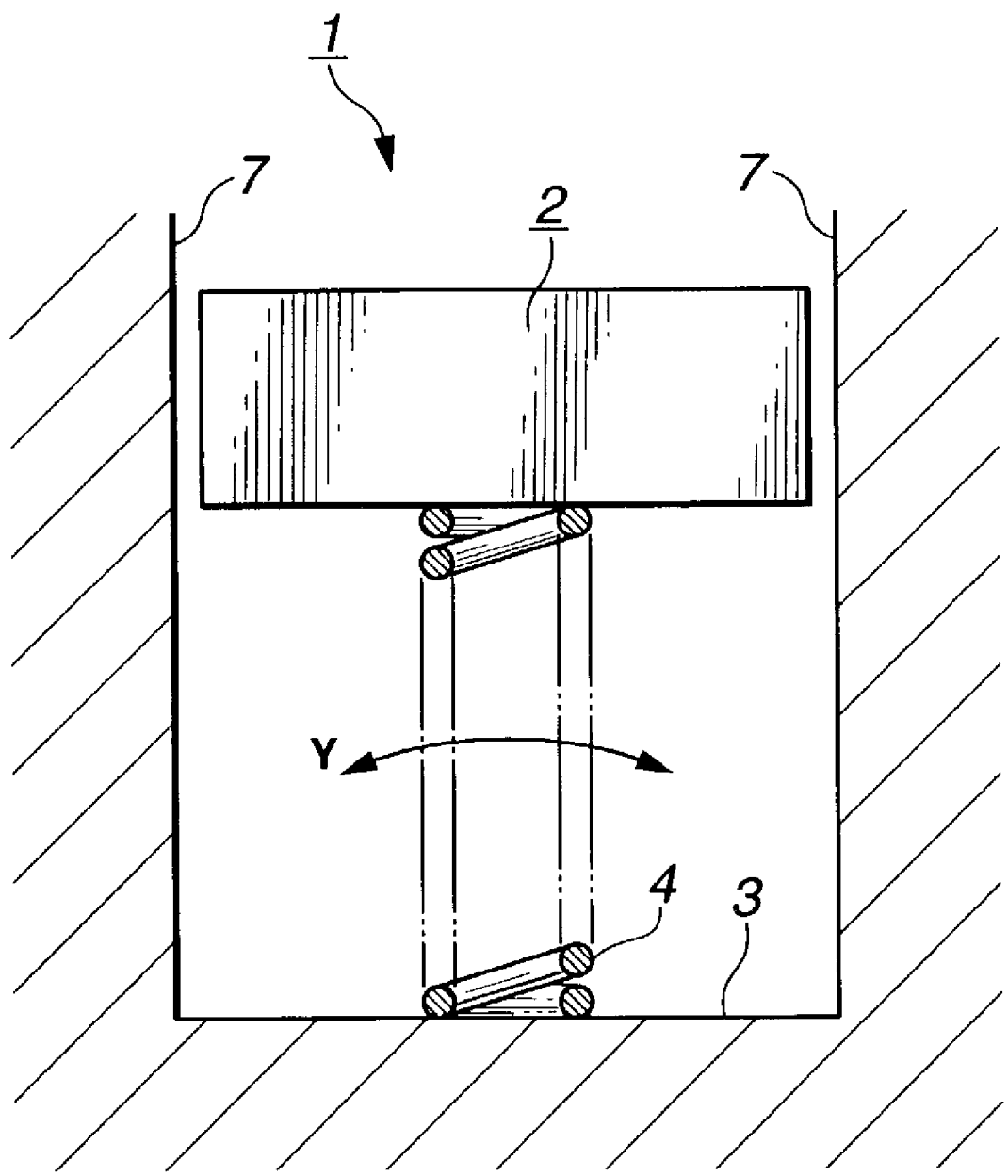
FIG. 13 is a schematic diagram showing an operation of the embodiment 5.

Next, an embodiment 5 of this invention will be described with reference to the accompanying drawings. FIG. 12 is an external perspective view of the embodiment 5 and FIG. 13 is a schematic view showing the operation of the embodiment 5. Parts identical with those of the embodiment 1 are assigned like reference numbers.

The embodiment 5 is characterized in that the elastic member 4 connects the generator member 2 to the base member 3 and that the generator member 2 is restricted in operation to oscillate only in a direction that causes the impact member 22 to strike the piezoelectric element 21.

In this embodiment a coil spring is used as the elastic member 4 and is secured at one end to the generator member 2 and at the other end to the base member 3. A guide member 7 is provided in proximity to the generator member 2 to restrict the motion of the generator member 2. Although there are differences in spring constant between a Z direction in which the generator member 2 oscillates vertically and other directions, the spring constants of the coil spring cannot be set so as to make smallest only the spring constant in the X direction of the elastic member 4 that matches the impact direction of the generator member 2 (W direction).

For this reason, the guide member 7 is provided which prevents the motion of the elastic member 4 when it oscillates in other directions than the X direction, for example, in a Y direction and guides the generator member 2 in the X direction. Here, the guide member 7 is provided in the form of walls that are close enough to prevent the generator member 2 from vibrating in the Y direction. This prevents the oscillation in the Y direction when the generator member 2 is subjected to an external force acting in a random direction, thus generating a natural vibration only in the X direction in which it is more easily displaced. Instead of the wall-shaped guide member 7, a rail-shaped guide member may be provided. In that case it is preferred that a frictional resistance be made minimal. While the elastic member 4 of the embodiment 5 uses a coil spring as described above, since its motion is restricted to a particular direction and its bending in that direction is utilized, the elastic member 4 of the embodiment 5 can also be referred to as a bending elastic member.

As described above, when the elastic member 4 cannot be mounted to the generator member 2 in such a way that the direction of the minimum spring constant of the elastic member 4 agrees with the impact direction of the impact member 22, this embodiment can restrict the motion of the generator member 2 by the guide member 7 provided nearby and generate an oscillation in the direction in which the impact member 22 impacts the piezoelectric elements 21, thus increasing the number of impacts and therefore the amount of electricity generated. Other actions and effects are similar to those of the embodiment 1.

Figure 14:
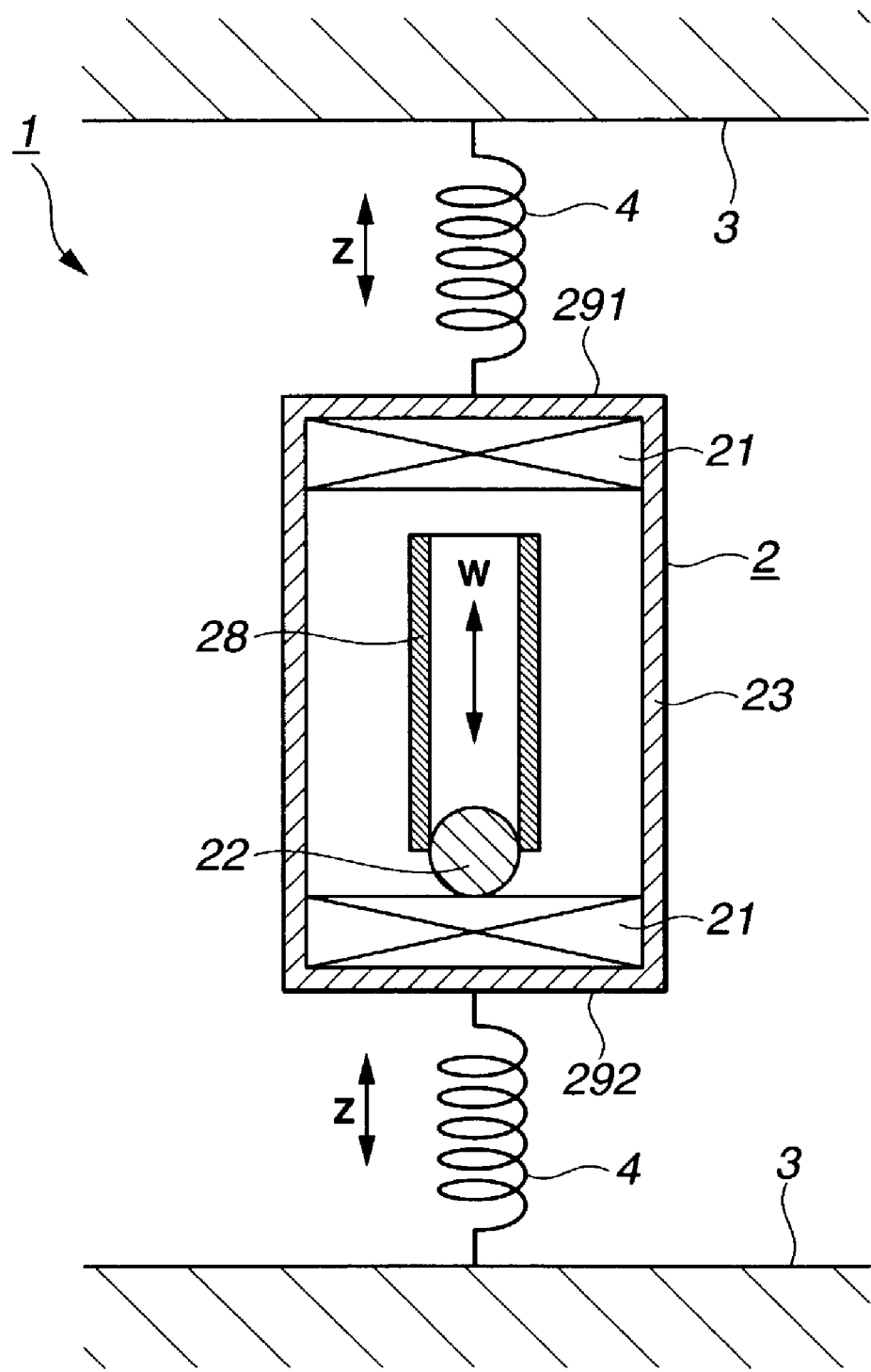
FIG. 14 is a cross section of an embodiment 6.

Next, an embodiment 6 of this invention will be explained by referring to the accompanying drawings. FIG. 14 is a cross section of the embodiment 6. Parts identical with those of the embodiment 1 are assigned like reference numbers and their explanations are omitted.

The oscillating-type generator 1 of the embodiment 6 is characterized in that the generator member 2 is sandwiched between the elastic members 4 and mounted through the elastic members 4 to the base member 3 so that, when applied an external force, the generator member 2 is oscillated by the expansion and contraction of the elastic members 4 to cause the impact member 22 to impact the piezoelectric elements 21 repetitively.

In this embodiment, the elastic members 4 use coil springs and the generator member 2 is disposed between the two elastic members 4 that are connected to the opposing base members 3, 3. The base members 3, 3 may be an integral, one-piece body or separate bodies. The elastic members 4 are attached to opposite ends of the generator member 2 (one end 291, other end 292) so that the expansion and contraction direction (arrow Z direction in FIG. 14) of the elastic members 4 agrees with the impact direction of the impact member 22 of the generator member 2 (arrow W direction).

While the coil spring has the smallest spring constant in the Z direction in which it expands and contracts, as described above, it is displaced easily also in other directions than the Z direction. Hence, if the coil spring as the elastic member 4 is attached to only one end of the generator member 2 and connected to the base member 3, the generator member 2, when not restricted as in the embodiment 5, will oscillate as a free end in a random direction. In the embodiment 6, because the generator member 2 is held between the elastic members 4, 4 connected to the opposing base members 3, 3, the free motion of the generator member 2 and the elastic member 4 is hindered and, when no external force is applied, the generator member 2 is pulled by the elastic members 4, 4 and thus assumes a neutral state. When an external force is applied, the generator member 2 is prompted to vibrate in the Z direction in which the elastic members 4, 4 are most easily displaced. Since the elastic member 4 of the embodiment 6 oscillates in the expansion/compression direction, it can also be referred to as an expansion elastic member. Further, the Z-direction oscillation coincides in direction with the oscillation in the impact direction (W direction) of the generator member 2, so that the impact member 22 can repeatedly impact the piezoelectric elements 21 in the generator member 2. Although the detailed construction of the generator member 2 is not shown in FIG. 14, it is similar to that of FIG. 3. Further, the elastic member 4 uses a coil spring with a spring constant that coordinates with an applied external force to reduce the period of oscillation in the Z direction.

It is also possible to provide the guide member 7 of the embodiment 5 around the generator member 2 to additionally prevent the motion in other directions than the expansion/contraction direction (Z direction) of the elastic member 4 or to install the generator member 2 and the elastic member 4 in a container that serves as the guide member 7 and the base member 3.

By holding the generator member 2 between the elastic members 4 connected to the base member 3, as described above, even a coil spring can be used as the elastic member 4 to prevent a motion of the generator member 2 in other than the impact direction (W direction) without requiring an additional member for restricting the motion, thereby securing a continuous generation of electricity. Further, because in the embodiment 6 the only difference between the oscillating state and the stationary state of the generator member 2 is its position in the Z direction, there is no need to secure a space around the generator member 2 that would otherwise be required considering the displacement of the generator member 2 during oscillation. This facilitates an overall miniaturization of the generator. Other actions and effects of this embodiment are similar to those of the embodiment 1.

Figure 15:
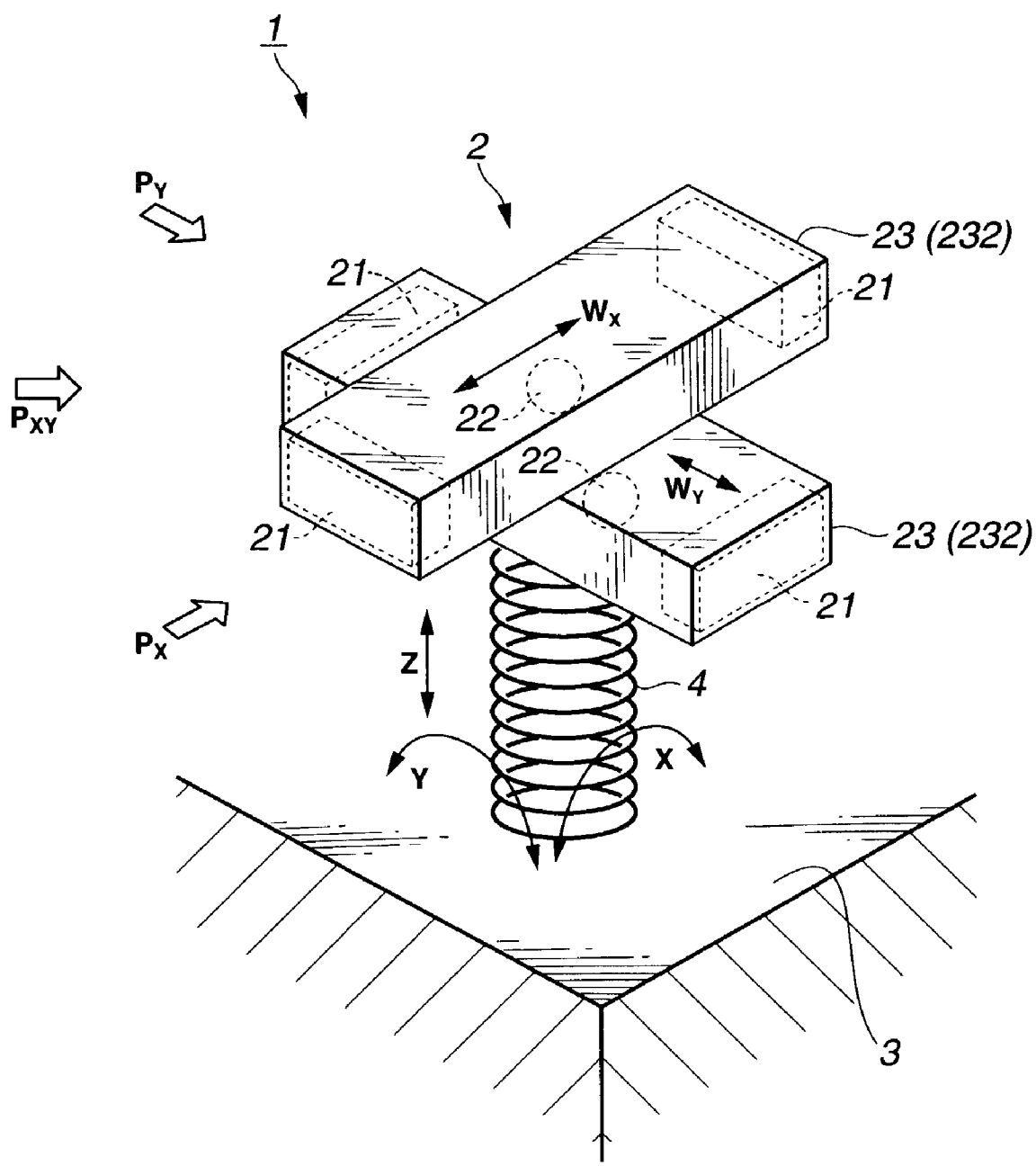
FIG. 15 is a perspective view of an embodiment 7.

Next, an embodiment 7 of this invention will be described with reference to the accompanying drawings. FIG. 15 shows an external perspective view of the embodiment 7 and FIG. 16 an external perspective view of a variation of the embodiment 7. Parts identical with those of the embodiment 1 are given like reference numbers and their explanations are omitted.

The oscillating-type generator 1 of the embodiment 7 is characterized in that the generator member 2 is so arranged that it can generate electricity in multiple directions of oscillation.

In this embodiment also, a coil spring is used for the elastic member 4. While the generator member 2 has the impact member 22, the piezoelectric element 21 and other members accommodated in the housing 23 as in the case of the embodiment 1 of FIG. 3, this embodiment differs from the embodiment 1 in that the generator member 2 has a plurality of housings 23 crossing each other. FIG. 15 shows two housings 23 (housings 231, 232) stacked so as to cross each other at 90 degrees, with one end of the coil spring secured vertically to an intersection of the two housings and the other end secured to the base member 3.

In the housing 231 the impact member 22 moves in an impact direction of arrow Wx while in the housing 232 another impact member 22 moves in an impact direction of arrow Wy, the two impact members 22 striking the associated piezoelectric elements 21 independently. The elastic member 4 uses a coil spring, one end of which is secured to the generator member 2 as shown in FIG. 15. When applied an external force, the generator member 2 moves as a free end and can be displaced in any direction having X- and Y-direction components. Thus, when the generator member 2 is applied an external force Px from the X direction, the impact member 22 of the housing 231 rolls in the Wx direction, impacting the piezoelectric element 21 to generate electricity. When an external force Py is applied from the Y direction, the impact member 22 of the housing 232 rolls in the Wy direction, impacting the piezoelectric element 21 to generate electricity. When an external force Pxy having X- and Y-directional components is applied, the impact members 22, 22 of the housings 231, 232 roll independently of each other, guided by guides 28 (not shown in FIG. 15), in the Wx and Wy directions respectively, generating electricity. That is, when an external force having X- and Y-directional components is applied, one or both of the housings 231, 232 generate electricity. Since the oscillating state is maintained by the elasticity of the elastic member 4, the generation of electricity continues. The coil spring chosen as the elastic member 4 has a spring constant that matches the applied external force to reduce the period of oscillation. In this embodiment 7, the elastic member 4 can utilize its expansion/contraction or bending depending on the direction of the housing 23.

As described above, since the generator member 2 has a plurality of housings 23 arranged to cross each other, each accommodating the piezoelectric element 21 and the impact member 22, the electric generation can be accomplished for oscillations in two or more directions, substantially improving a generation efficiency for an external force P.

While in the embodiment 7 two housings 23 make up the generator member 2, three or more housings 23 may be combined to cross each other. The crossing arrangement of the housings is not limited to a cross configuration but triangular and quadrangular configurations are also possible. Further, in the construction of FIG. 15 another housing 23 having an impact member 22 rolling in a Wz direction may be added so that even an oscillation of the elastic member 4 in a Z direction can produce electricity.

Figure 16:
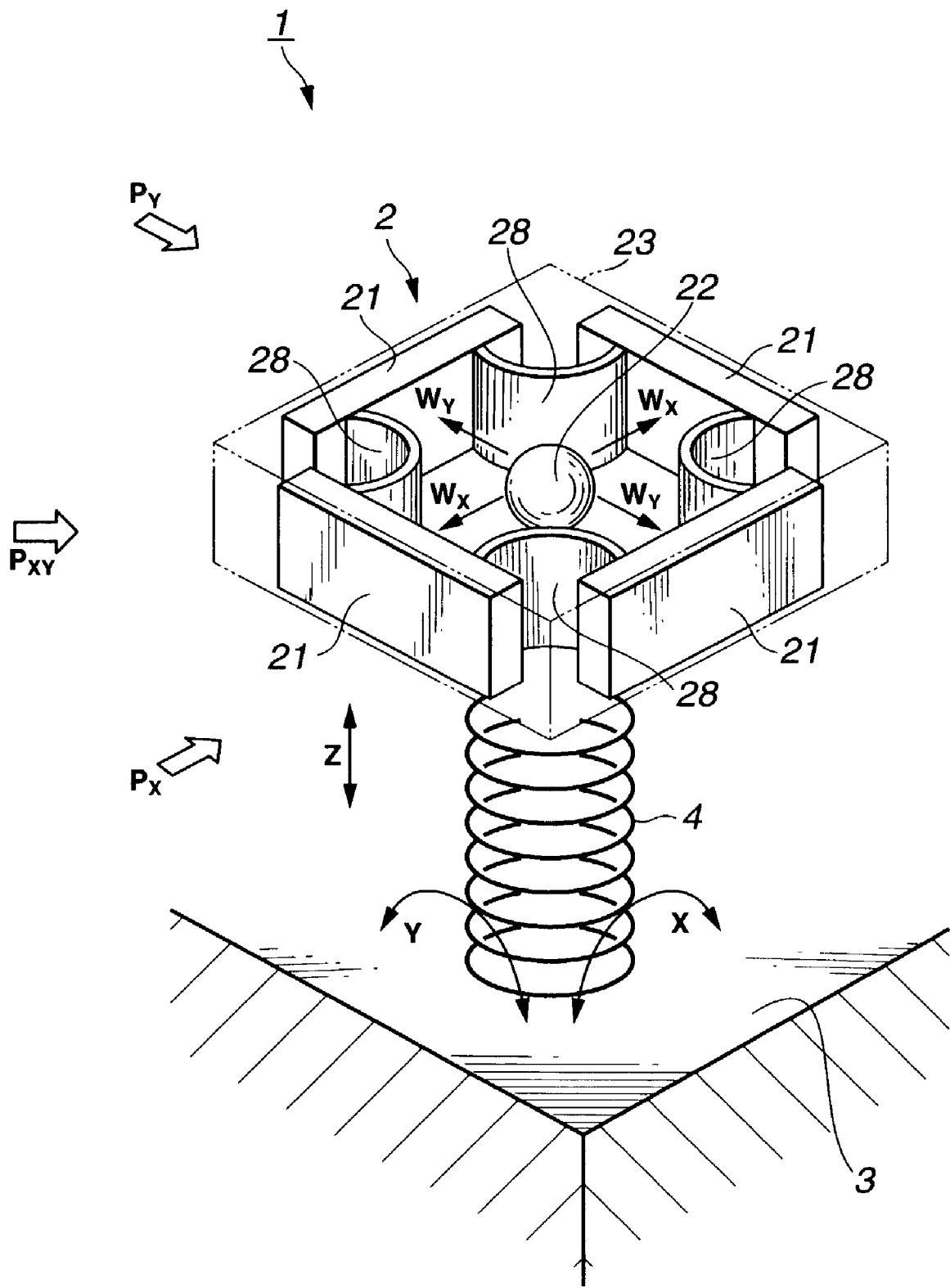
FIG. 16 is a perspective view showing a variation of the embodiment 7.

As a variation of the embodiment 7, FIG. 16 shows a construction in which an impact member 22 having a plurality of impact directions is installed in a single housing 23. In the boxlike housing 23, four wall surfaces facing each other in the X and Y directions are each provided with a piezoelectric element 21 and a single impact member 22 is adapted to impact these piezoelectric elements 21. To guide the impact member 22 to strike a center of each piezoelectric element 21, guides 28 are provided each of which has a partition plate with a curved surface. That is, in the construction of FIG. 15 a plurality of impact members 22 move independently in different planes in a plurality of oscillation directions, whereas in the construction of FIG. 16 a single impact member 22 moves on one and the same plane in a plurality of oscillation directions to generate electricity. The impact member 22 rolls in the Wx direction when an external force Px is applied and, when applied an external force Py, rolls in the Wy direction, as shown in FIG. 16. When applied an external force Pxy having X- and Y-directional components, the impact member 22 is urged along the curved surfaces of the guides 28 to strike one of the piezoelectric elements 21. This arrangement allows the generator member 2 to generate electricity for oscillations in a plurality of directions, improving the generation efficiency.

As described above, in the present invention a generator member having an impact member adapted to impact piezoelectric elements is connected to a base member through an elastic member so that the generator member upon receiving an external force oscillates to cause the impact member to repeat impacting the piezoelectric elements. This arrangement makes it possible to increase the number of times that the generator member generates electricity by a single external force, increasing a total electric power generated.

Selecting for the elastic member a material which reduces the period of oscillation of the generator member can increase the number of impacts per unit time, which in turn increases the overall generating capacity.

Further, by using as the elastic member an elastic body with a directivity in the spring constant and mounting the elastic member to the generator member such that the direction of the smallest spring constant of the elastic member matches a direction in which the impact member strikes the piezoelectric elements, vibrations that hinder the impact motion of the impact member against the piezoelectric elements are not easily produced, thus allowing only the impact motions to be generated efficiently.

Further, by restricting the oscillation of the generator member to only the direction in which the impact member impacts the piezoelectric elements, it is possible to use even an elastic member with no directivity in spring constant and still increase the number of impacts and therefore the total amount of electricity generated.

Further, when an elastic member with no directivity in spring constant is used, the number of impacts and therefore the total amount of electricity generated can also be increased by constructing the generator member 2 so as to be able to generate electricity for a plurality of oscillation directions.

What is claimed is:

1. An oscillating-type generator comprising:
   a generator member to generate electricity by causing an impact member to impact a piezoelectric element; and
   an elastic member having an elasticity and attached to the generator member, the elastic member being adapted to, when applied an external force, oscillate the generator member to cause the impact member to repeat impacting the piezoelectric element.

2. An oscillating-type generator comprising:
   a generator member to generate electricity by causing an impact member to impact piezoelectric elements arranged to oppose each other; and
   an elastic member having an elasticity and attached to the generator member, the elastic member being adapted to, when applied an external force, oscillate the generator member to cause the impact member to repeat impacting the opposing piezoelectric elements.

3. An oscillating-type generator according to claim 1 or 2, wherein as the elastic member an elastic body is selected which has a spring constant that matches the external force to reduce a period of the oscillation.

4. An oscillating-type generator according to any one of claim 1 or 2, wherein the elastic member is made from an elastic body having a directivity in a spring constant and is connected to the generator member such that a direction of the smallest spring constant of the elastic member agrees with a direction in which the impact member impacts the piezoelectric elements.

5. An oscillating-type generator according to any one of claim 1 or 2, wherein a base member is connected to the generator member through the elastic member to support the generator member, the external force is applied to at least one of the generator member, the base member and the elastic member, and the elastic member is connected to the generator member and the base member so that a natural oscillation produced by the generator member and the elastic member resonates with a natural oscillation of the base member.

6. An oscillating-type generator according to any one of claim 1 or 2, wherein a base member is connected to the generator member through the elastic member to support the generator member, the external force is applied to at least one of the generator member and the elastic member, and the base member is fixed so that it does not oscillate.

7. An oscillating-type generator according to any one of claim 1 or 2, wherein the elastic member is made from a leaf spring.

8. An oscillating-type generator according to any one of claim 1 or 2, wherein the elastic member is formed into a shape such that a spring constant for an oscillation in a direction in which the impact member impacts the piezoelectric elements is the smallest of spring constants of the elastic member.

9. An oscillating-type generator comprising:
   a generator member to generate electricity by causing an impact member to impact piezoelectric elements; and
   an elastic member having an elasticity and attached to the generator member, the elastic member being adapted to, when applied an external force, oscillate the generator member to cause the impact member to repeat impacting the piezoelectric elements;
   wherein the generator member is restricted in motion to oscillate only in a direction in which the impact member impacts the piezoelectric elements.

10. An oscillating-type generator according to claim 9, wherein the generator member is supported to oscillate only in a direction in which the impact member impacts the piezoelectric elements.

11. An oscillating-type generator according to claim 9 or 10, wherein a guide member is provided in proximity to the generator member to guide the generator member to oscillate only in a direction in which the impact member impacts the piezoelectric elements.

12. An oscillating-type generator comprising:
    a generator member to generate electricity by causing an impact member to impact piezoelectric elements; and
    elastic members with an elasticity;
    wherein the generator member is held between the elastic members and, when applied an external force, oscillates by expansion and contraction of the elastic members to cause the impact member to repeat impacting the piezoelectric elements.

13. An oscillating-type generator according to claim 12, wherein the elastic members are connected to opposite ends of the generator member so that the expansion/contraction direction of the elastic members agrees with an impact direction of the impact member of the generator member.

14. An oscillating-type generator comprising:
    a generator member to generate electricity by causing an impact member to impact piezoelectric elements; and
    an elastic member having an elasticity and attached to the generator member, the elastic member being adapted to, when applied an external force, oscillate the generator member to cause the impact member to repeat impacting the piezoelectric elements;
    wherein the generator member is arranged to be able to generate electricity for a plurality of oscillation directions.

15. An oscillating-type generator according to claim 14, wherein the impact member and the piezoelectric elements are accommodated in a housing and a plurality of such housings are combined to cross each other and connected to the elastic member.

16. An oscillating-type generator according to any one of claim 9 or 10, wherein the elastic member is made from a coil spring.

* * * * *